(No Model.) 8 Sheets—Sheet 1.

A. LAGERMAN.
TYPE JUSTIFYING APPARATUS.

No. 478,340. Patented July 5, 1892.

Attest:
Geo. T. Smallwood.
Philip Mauro.

Inventor:
Alexander Lagerman
by A. Pollok
his attorney.

(No Model.) 8 Sheets—Sheet 2.

A. LAGERMAN.
TYPE JUSTIFYING APPARATUS.

No. 478,340. Patented July 5, 1892.

(No Model.) 8 Sheets—Sheet 3.

A. LAGERMAN.
TYPE JUSTIFYING APPARATUS.

No. 478,340. Patented July 5, 1892.

FIG. 3.

Attest
Geo. T. Smallwood.

Inventor
Alexander Lagerman
by A. Pollok
his attorney.

FIG_5.

(No Model.) 8 Sheets—Sheet 6.

A. LAGERMAN.
TYPE JUSTIFYING APPARATUS.

No. 478,340. Patented July 5, 1892.

Attest:
Geo. T. Smallwood.
Philip Mauro

Inventor
Alexander Lagerman
by A. Pollok
his attorney (No Model.) 8 Sheets—Sheet 7.

A. LAGERMAN.
TYPE JUSTIFYING APPARATUS.

No. 478,340. Patented July 5, 1892.

Attest:
Geo. T. Smallwood
Phil. ph. bams.

Inventor:
Alexander Lagerman
by A. Pollok
his attorney.

(No Model.) 8 Sheets—Sheet 8.

A. LAGERMAN.
TYPE JUSTIFYING APPARATUS.

No. 478,340. Patented July 5, 1892.

Attest.
Geo. T. Smallwood.
Philip Mauro.

Inventor:
Alexander Lagerman
by
J. Pollok
his attorney.

UNITED STATES PATENT OFFICE.

ALEXANDER LAGERMAN, OF JÖNKÖPING, SWEDEN.

TYPE-JUSTIFYING APPARATUS.

SPECIFICATION forming part of Letters Patent No. 478,340, dated July 5, 1892.

Application filed December 10, 1888. Serial No. 293,135. (No model.) Patented in England February 10, 1888, No. 2,066; in France August 11, 1888, No. 192,350; in Belgium August 11, 1888, No. 82,873, and in Italy October 11, 1888, XLVII, 219.

*To all whom it may concern:*

Be it known that I, ALEXANDER LAGERMAN, of Jönköping, in the Kingdom of Sweden, have invented a new and useful Improvement in Type-Justifying Apparatus, (which has been patented in Great Britain by Patent No. 2,066, dated February 10, 1888; in France by patent No. 192,350, dated August 11, 1888; in Belgium by Patent No. 82,873, dated August 11, 1888, and in Italy by Patent No. 219, Vol. XLVII, dated October 11, 1888,) which improvement is fully set forth in the following specification.

When types are composed by machinery, they are often arranged in successive rows in a galley, each row intended to be a line of form; but these lines are seldom precisely of the length which they are required to have in the form. The lines have therefore to be justified by introducing between the words space-types of less or greater thickness, according as the line requires to be shortened or lengthened.

My invention relates to apparatus for this purpose so arranged that the required lengthening or shortening of each composed line is indicated to the operator, and that he can rapidly and easily without exercise of skill, but by merely setting a gage to suit the indication of length and moving certain handles, give the line the proper length and place it in the form.

In the first place, I provide space-types of several different thicknesses. I find that three thicknesses are generally sufficient; but four— such as three-twelfths, four-twelfths, five-twelfths, and sixth-twelfths of an em-quad— give greater facility for justifying, and I use one set of these—say those of one of the middle thicknesses, such as the five-twelfths space—in composing the lines, which therefore present themselves in the grooves of the galley with spaces of only this one thickness separating the words. I transfer the galley, with its rows of types in this condition, to a slide on the justifying-machine, on which it lies inclined somewhat backward, presenting the faces of the types to the operator. Above this slide there are several nearly-vertical channels side by side, containing rows of space-types of the three other thicknesses, those of one thickness in each channel. At the lower end of those channels there is a reciprocating transverse slide having its front wedge-shaped, and behind that a shoulder, which passes to and fro under the channels containing the space-types. The operator moves the galley until the front line of its types comes up to a certain position. He then brings a hook-finger down on this row of types, which he then pushes up. The hook-finger, according as it is raised above its normal position by a line of types too long or as it is left below its normal position by a line of types too short, shows the operator by an index on a graduated scale to what extent the space-types must be changed by introducing thicker or thinner spaces in order to bring the whole line to its proper length. He sets an index accordingly, and then by turning a hand-wheel the operator causes a line of type to ascend until a gage-point, which is kept back by the tops of the character-types, advances, when a space presents itself over the top of a space-type, which is shorter than the character-types. When this gage advances into the space, the upward movement of the line of types is arrested and the transverse slide advances, pushing out from between the types the space already there and substituting for it one or other or a combination of several of the space-types of different thicknesses, the particular space or spaces thus substituted descending from their channels, as determined by a stepped slide, which had been previously adjusted by the hand of the operator in conformity with the index of length mentioned above. This is repeated for several or all of spaces in the line, the index of length altering its position for every substitution of space effected until it arrives at zero, this showing that the line has been altered to the proper length. The line thus justified is then pushed by a transverse slide into its place in a slip-galley, ready to be made up into pages, and if required a lead which spaces line from line is automatically pushed forward and up against the line thus advanced into the slip-galley.

By employing only a few thicknesses of space-types, as above mentioned, using those of one of the middle thicknesses in composing and afterward in justifying, substituting, when necessary, for some or all of these the thicker or thinner spaces or combinations of several of those, I am enabled to effect all such justification as is required for ordinary forms.

There may, however, be space-types of other thicknesses employed, according as the conditions of the composition and justification may require.

Such being the general character and operation of justifying apparatus according to my invention, I will now proceed to describe its construction, referring to the accompanying drawings, in which—

Figure 1 is a front view. Figs. 2 and 3 are sectional views on lines A B C D, Fig. 1, respectively. The plan of section of these figures is at right angles to the inclined face of the machine, and therefore oblique to the horizon. Fig. 10 is a front view of the dial and index, showing required spaces. Fig. 10$^a$ is a detail of index T$^4$. Fig. 23 is a detail view showing the construction of cam-arm Y.

Figures 6, 7, 8, 9, 15, 20, 21, 22:
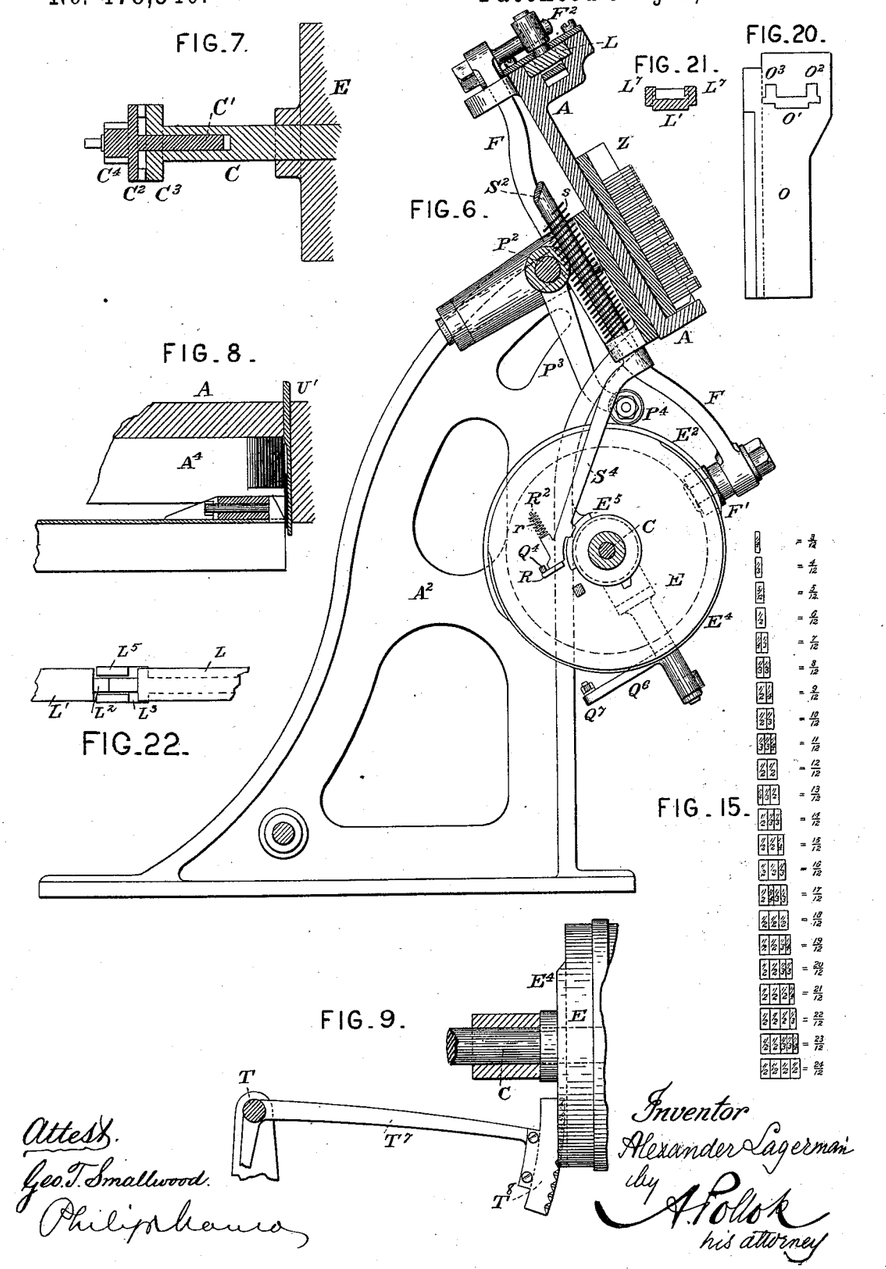
Fig. 7 is a part longitudinal section showing the clutch to the driving-spindle C.
Fig. 8 is a part sectional plan of the feed for leads.
Fig. 9 is a part plan showing the operation of the adjusting and holding flange of E.
Fig. 15 shows combinations of a few space-types to make up a number of different thicknesses.
Figs. 20 and 21 show, respectively, the passage for the wedge of the slide and a transverse section of the wedge itself for opening a space in a row of types.
Fig. 22 is a detail in plan showing the forked slide.

A is the main frame, which is inclined backward and is supported on end frames A' A$^2$. A shaft C, mounted in bearings in the end frame A and in a bracket B, can be turned by a hand-wheel D, having a handle D'. On the shaft C is fixed a barrel-cam E, in the groove E' of which is engaged a roller F', Fig. 6, at the end of a lever F, which by its pin F$^2$ gives reciprocating motion to the horizontal slide L. As shown in Fig. 7, the end of the shaft C is bored to receive the spindle C', and terminates in an obliquely-serrated disk C$^3$, against which another obliquely-serrated disk C$^2$ on the spindle C' can be brought to bear, the two forming a clutch for driving a pinion C$^4$ on the spindle C', which pinion gears with the partially-toothed wheel H. By means of this clutch and the operating mechanism hereinafter to be described the wheel H and the mechanism which carries the line of type to be justified can be operated intermittently from the handle D' and shaft C.

From a pin H' on the wheel H extends a bent rod H$^2$, a roller H$^3$ on which is engaged in a curved slot I', formed in a bracket projecting from a slide I. When the wheel H turns partly round in the direction of the arrow, the rod H$^2$ raises the slide I until the roller H$^3$ meets an inclined guide A$^3$, Fig. 5, by which it is directed into the oblique part of the slot I', the slide I then ceasing to move upward during the rest of the movement of the wheel H. On the wheel H are fixed two curved guides H$^6$ and H$^7$, which at each end of the stroke of the wheel H move outward and inward, respectively, a roller K$^4$, mounted on a slide U, as will hereinafter be described. Guide H$^7$ acts after the feed-slide stops and while roller H$^3$ is moving in the inclined slot I'.

Figures 1, 10, 10A, 23:
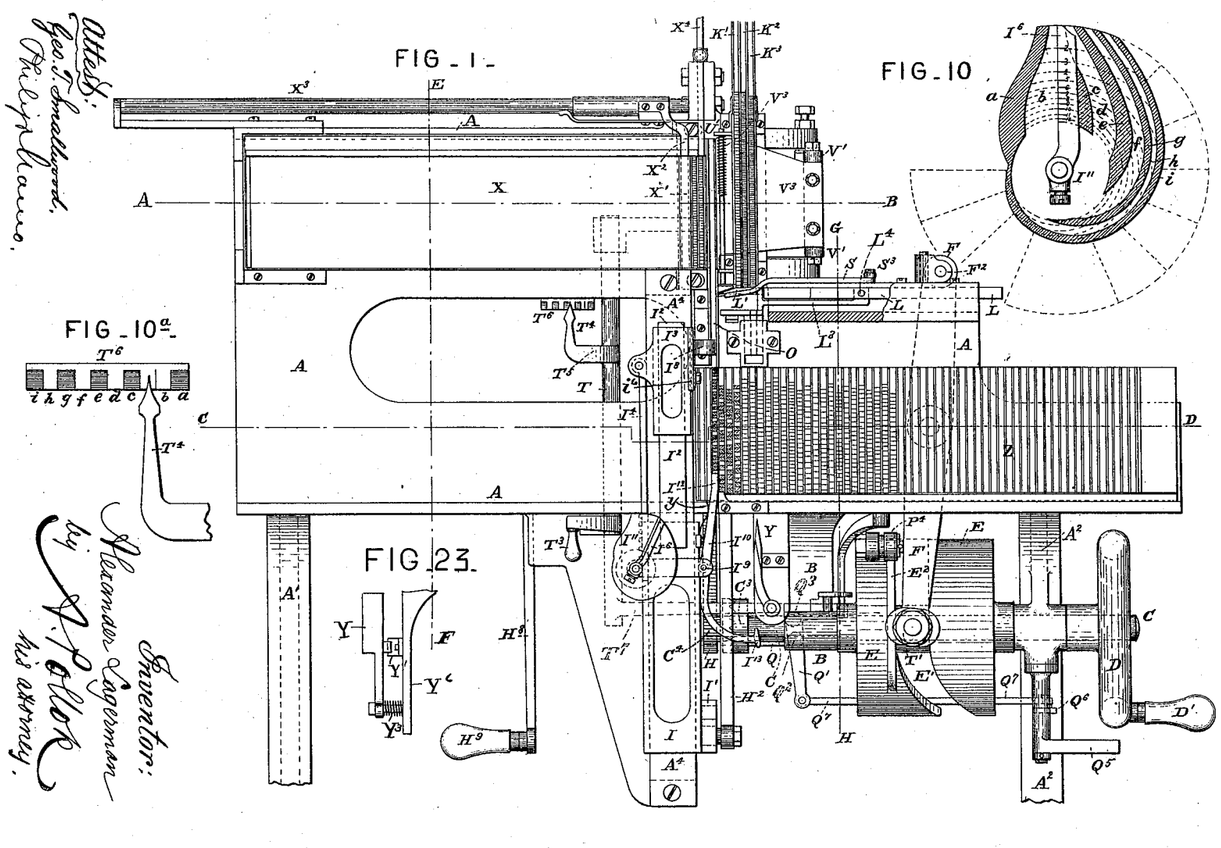
Figure 2:
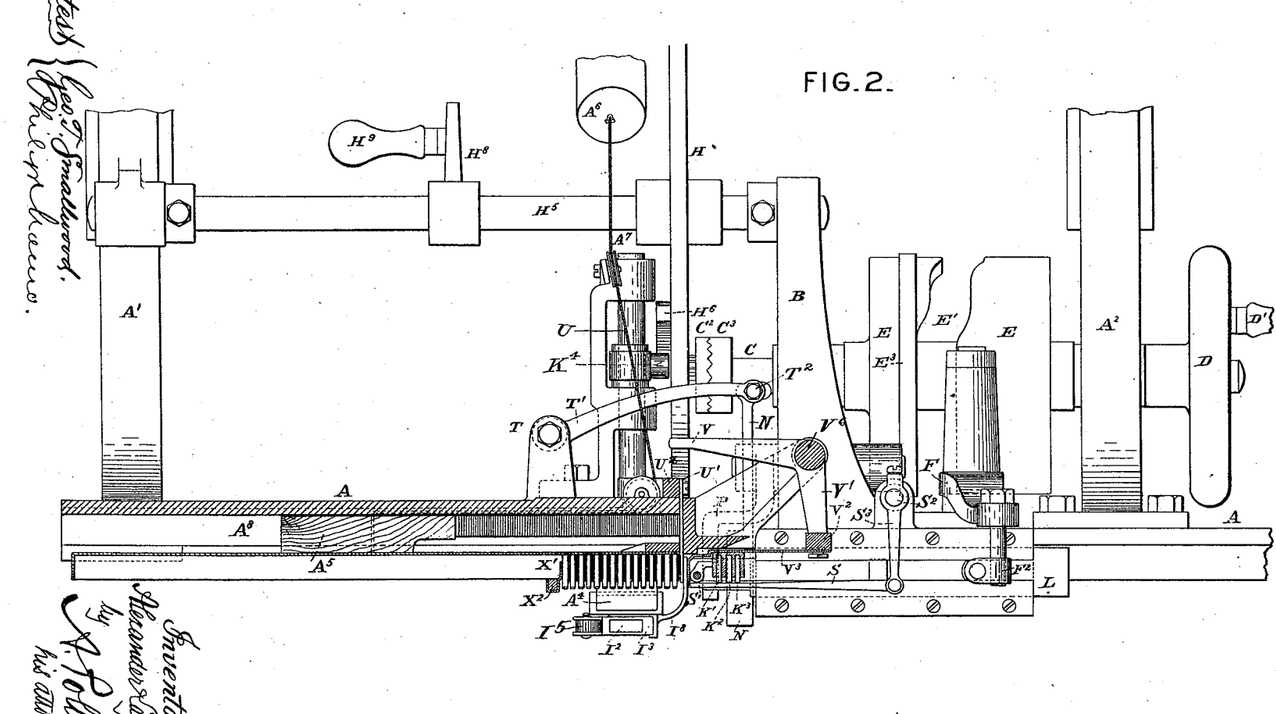
Figure 5:
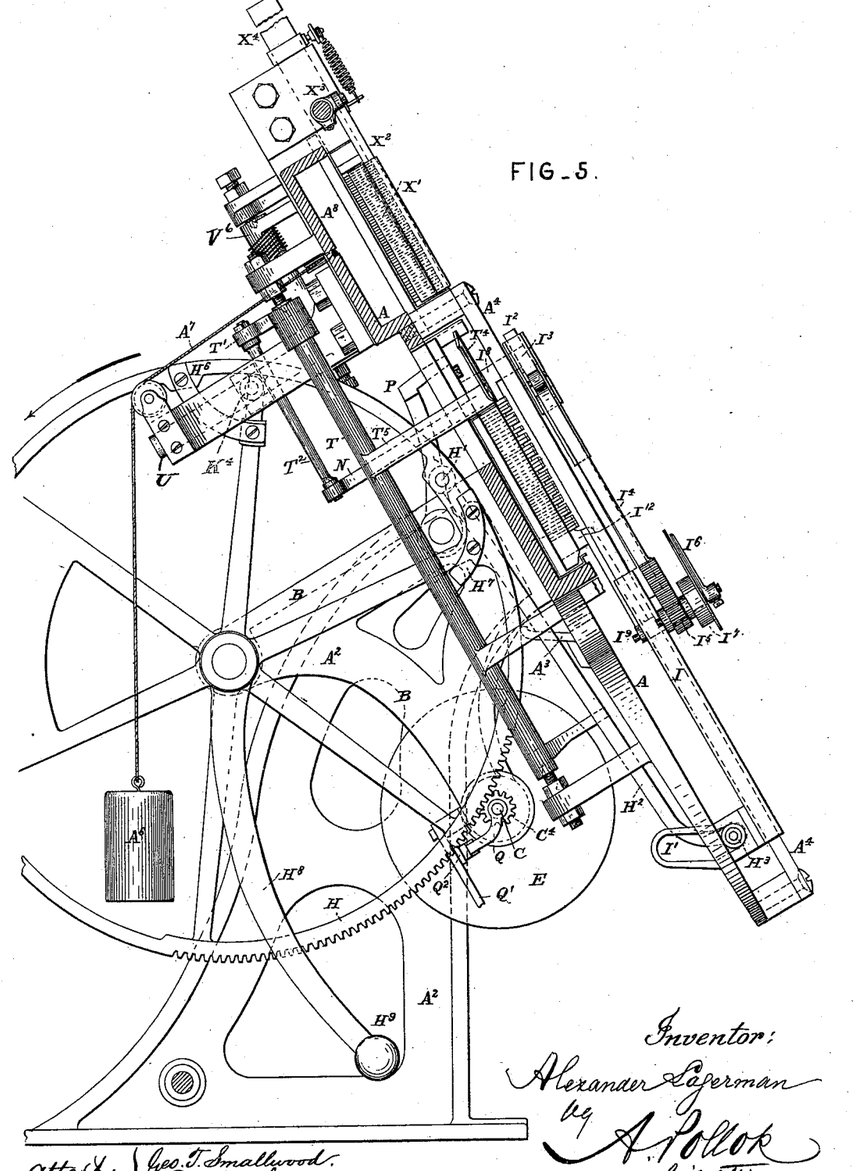
Figs. 5 and 6 are transverse sections, respectively, on E F and G H of Fig. 1. The other figures show details hereinafter referred to—that is to say.

On H$^5$, the shaft of the wheel H, is fixed a bent arm H$^8$, with handle H$^9$, by which the wheel H can be moved by hand. The slide I moves up and down along a bar A$^4$ and has fixed to it a bar I$^2$, on which is guided another slide I$^3$. From this extends downward a rod I$^4$, terminating in a rack which gears with a pinion I$^5$. On the spindle of this pinion is fixed an index I$^6$, and the spindle is urged by a volute spring in a box I$^7$, so as to press the slide I$^3$ downward. A hooked arm I$^8$, Figs. 1, 2, and 5, is fixed to the slide I$^3$, and on a pin I$^9$ on the slide I is pivoted a lever I$^{10}$. The upper end I$^{12}$ of this lever I$^{10}$ is arranged to move in the grooves of the galley Z, and in ascending it carries with it the line of type in the groove in which it lies. This line of type is then held between the end of lever I$^{10}$ and the hooked arm I$^8$ and so carried to the devices which displace the space-types from between the several words of the line and introduce other space-types of proper width to justify such line.

Figure 11:
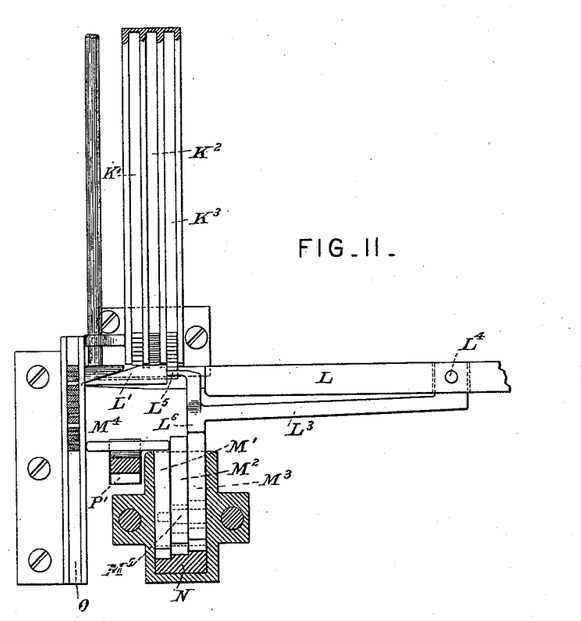
Figs. 11, 12, 13, 14, 17, 18, and 19 are part elevations showing the operation of the slide in introducing spaces of various thicknesses.
Figure 12:
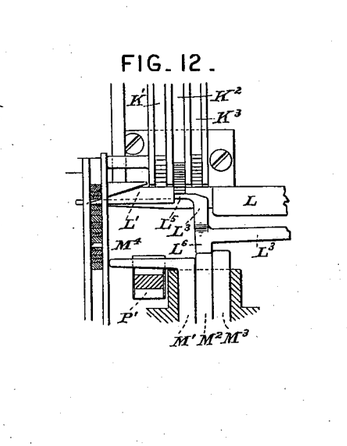
Figure 13:
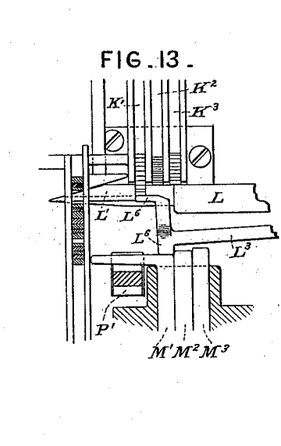
Figure 16:
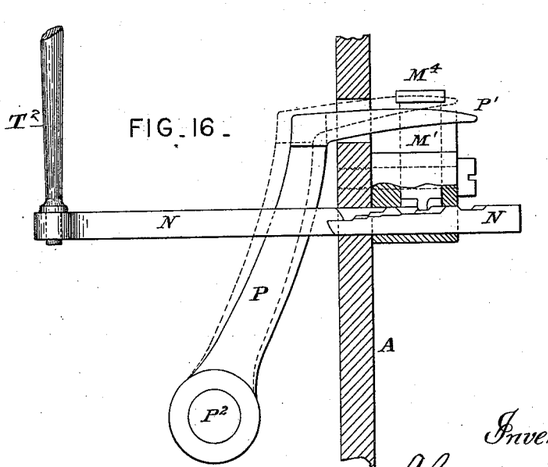
Fig. 16 is a part transverse section showing the appliance for determining thickness of spaces.
Figure 17:
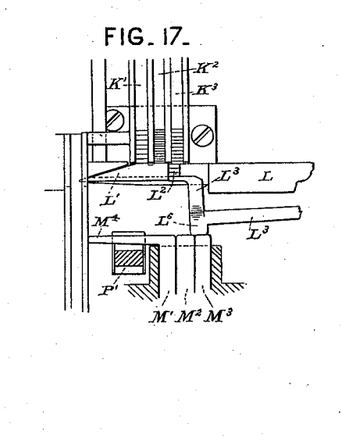
Figure 18:
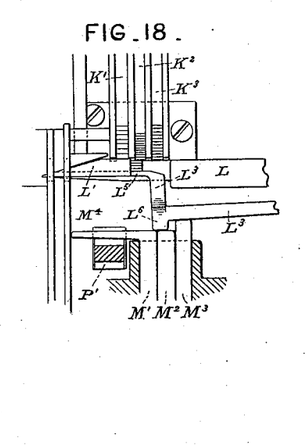
Figure 19:
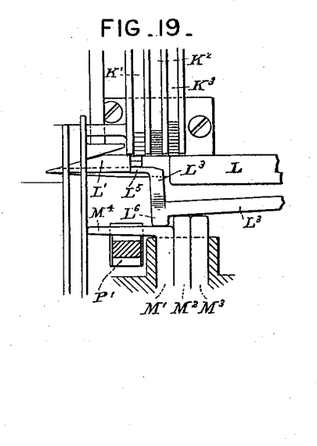

Leaving for the present the devices for feeding the line of type, the construction of the mechanism for placing the proper space-types in the line will now be described. On the upper part of the frame are channels K' K$^2$ K$^3$, containing space-types of different thicknesses, such as are mentioned above as advancing by twelfths of an em-quad, these being ready to be introduced singly or variously combined, as the case may be, between the words of type in each line. The slide L, as shown in Fig. 17, terminates in a wedge L', behind which is a transverse slot L$^2$ to receive one or the other of the space-types from the channels K' K$^2$ K$^3$; also, on a pin L$^4$ of the slide L is pivoted an arm L$^3$, (see Fig. 11,) which terminates in a fork L$^5$, (see Fig. 22,) projecting upward, with its prongs one on each side of a thinned part of the slide L, (where the transverse slot L$^2$ occurs,) and a foot L$^6$ under the fork L$^5$ as the slide L moves to and fro glides over the tops of three vertical slides M' M$^2$ M$^3$. These slides, as shown in Figs. 11 and 16, rest on a notched bar N, which is moved to and fro transversely to the slide L. When the slide L is at the extreme of its stroke to the right, the slot L$^2$, as shown in Fig. 11, is immediately under the channel K$^3$, and the fork L⁵, if it were then in its highest position, would prevent a space-type from entering the slot, and consequently as L moved to the right it would carry no space-type with it. If, however, under slide M³ there is a notch of the bar N the depth of a K³ space-type or of several of these, one or more of these will drop into the slot L² and will be carried forward by the slide L. If slides M′ and M² have the same depression as M³, as indicated in Fig. 17, no space-types will be taken from channels K′ K² because the slot L² is already charged from K³. If, however, slides M² and M′ be lower than M³, one or more space-types, as determined by the depressions of slides M² M′, may enter the slot L² from channels K² K′, while the slide rests for a moment with the slot L² opposite each of these channels, as indicated by Figs. 12 and 13. Thus the selection of the separate or combined space-types received in the slot L² depends upon such of the notches in the bar N as are brought for the time being under the slides M′ M² M³. Fig. 15 indicates how various widths of spaces may be formed by combinations of the three space-types, respectively three-twelfths, four-twelfths, and six-twelfths of an em-quad. In order, however, to be able to use all the widths shown in Fig. 15, the slot L² would necessarily be deeper than it is shown in the other figures.

Figure 14:
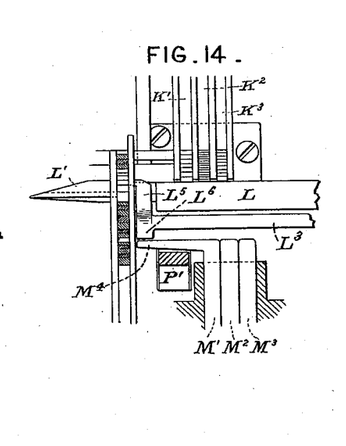

The terms "selecting device" or "selecting-slide," as hereinafter used in the claims following this specification, refer to the slide L and the term "discharging device" to the arm L³ and its fork L⁵; but it will be understood that it is not intended to limit the invention to that construction of mechanism which is herein shown and described as the best mode known to me of applying the principle of the said invention. So far as I am aware no mechanism for selecting a proper space-type or combination of such types and inserting the same between the words in a line of composed matter has ever been devised prior to my invention thereof. As indicated in Figs. 11 and 12, the wedge L′ as it advances to the left pushes a space out from between two words of the composed line of types. The channel O, up which the composed line is pushed, as shown in Fig. 20, has an opening O′ O² O³, suited for passage of the wedge L′, a transverse section of which is shown by Fig. 21, this being formed with side ribs L⁷, which are of such depth that they raise the portion of the composed line above them sufficiently far to admit the deepest of the spaces contained in the slot L². When the slide L has fully advanced, the cam protuberance E² on E (see Figs. 1 and 6) raises a roller P⁴ on an arm P³ of a rocking shaft P², and thus an arm P P′ on the same shaft P², Fig. 16, is raised, lifting the tail M⁴ of the slide M′, Fig. 14. This slide has fixed in it a pin M⁵, Fig. 11, projecting through slotted holes in the slides M² and M³, so that when M′ is lifted by P′ the other slides M² M³ are raised also. When M⁴ is thus lifted, the fork L⁵ is raised, moving up out of the slot L² the space-types which it held, (see Fig. 14,) thus putting them in the line of composed matter in the place of the space-type that had been pushed out by the advance of L′ and allowing the shoulder of L′ to retreat. During the retreat of L the fork L⁵ is kept up to prevent any spaces from dropping into the slot L² from the channels K′ K² K³.

Figure 3:
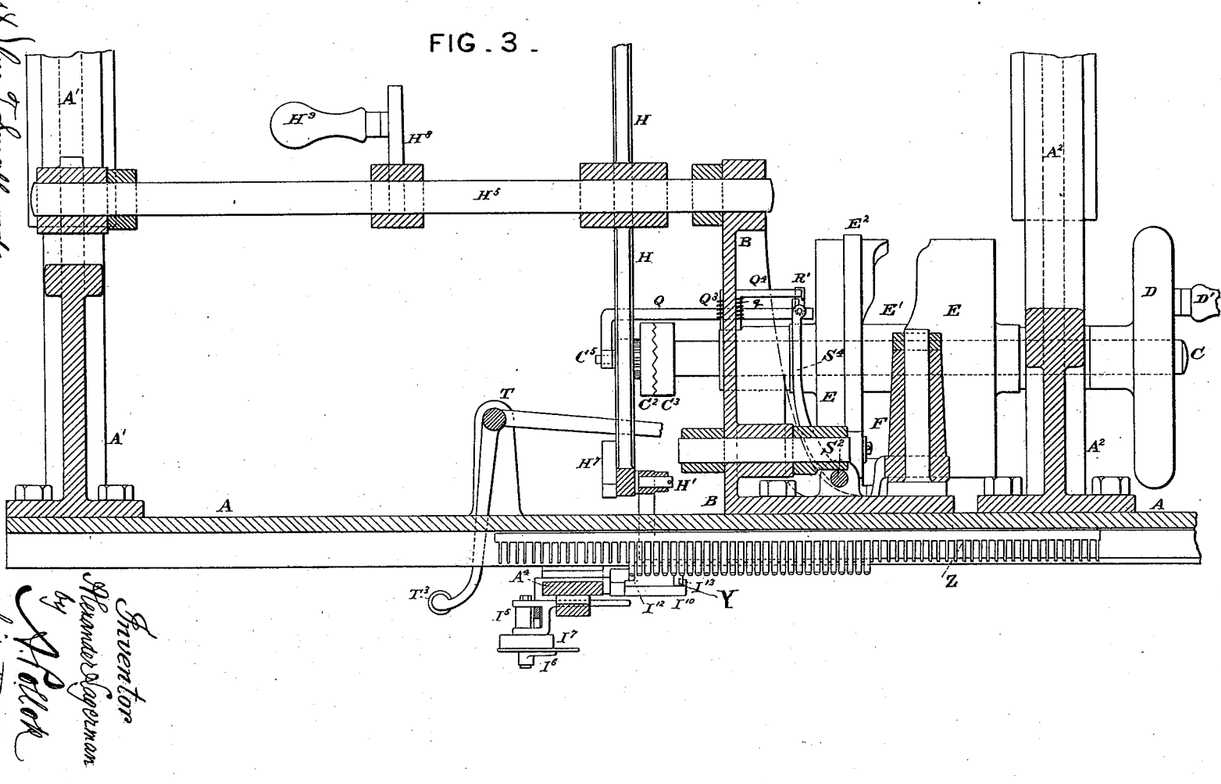
Figure 4:
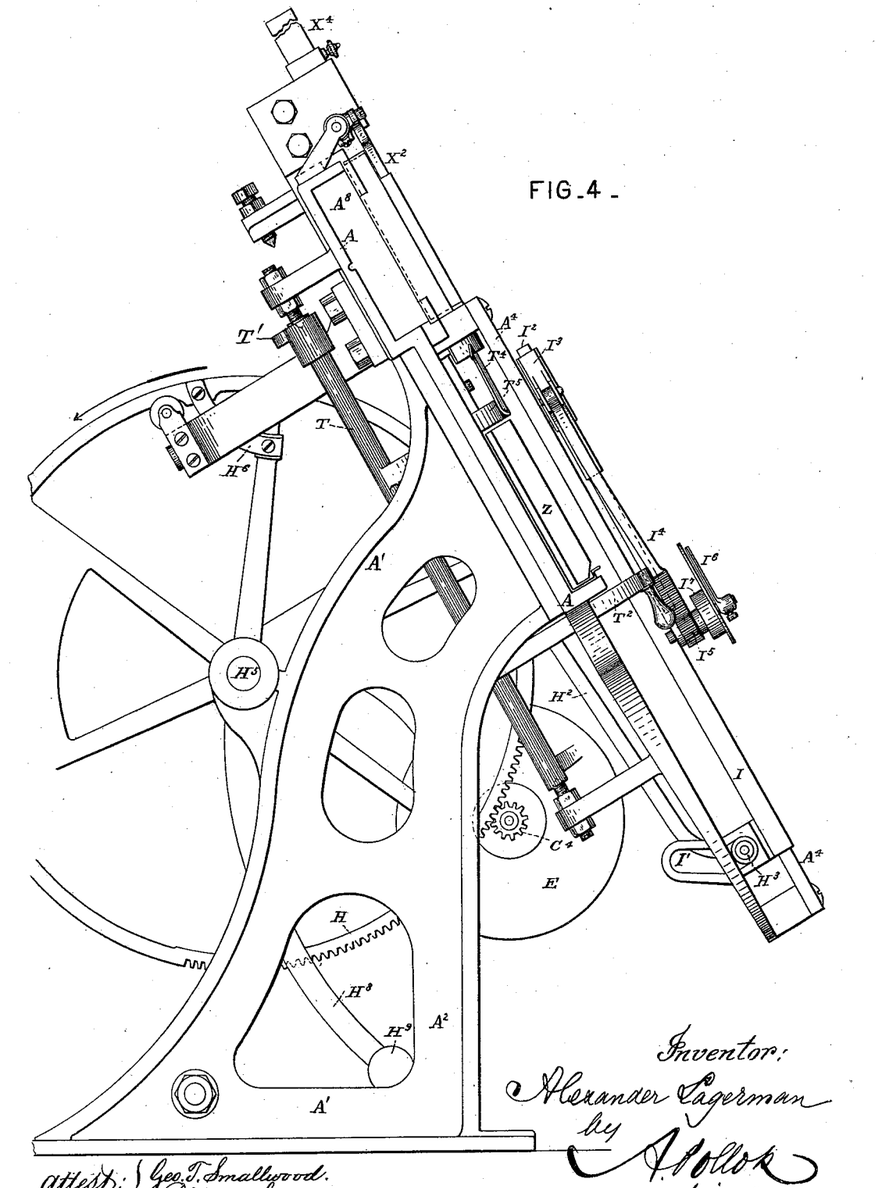
Fig. 4 is an end view.

In using the machine the operator turns handle D′ one revolution each time the line of type carried by the slide I comes to such a position that a space-type is opposite the end of the slide L, and this operation is repeated until the line is fully justified. The line of type is arrested and held at such times by the operation of an arm S, having a finger S′, which is thrust by the action of a spring between the types, forming a word, as hereinafter described. Wheel H, which actuates the slide I, is moved intermittently from shaft C through a clutching device, which becomes disengaged and permits wheel H and slide I to remain stationary when the arresting-finger S comes into action. The clutch-disks C² C³, Figs. 2 and 3, are pressed together by a sliding bar Q, guided on a pin C⁵ on pinion C⁴, which is rigid with the movable clutch-disk C². Bar Q is jointed at Q² to lever Q′, the latter being pivoted at Q³ to the frame and provided on its pivot with a spring q, which tends to hold the two members of the clutch together with yielding pressure. Lever Q′ has a horizontal arm Q⁴, resting on the projection R′ of a rod R², carried by the lower end of an arm S⁴. Rod R² is held up by a spring r strong enough to hold the arm Q⁴ in position to keep the clutches engaged under ordinary circumstances, but capable of yielding in case of unusual strain. The lower end of lever Q′ is connected by rod Q⁷ to an arm Q⁶ on a shaft mounted on boss A², Fig. 1. This shaft has a handle Q⁵ in convenient position to enable the operator, when the line has been justified, to release wheel H entirely from the control of shaft C by disengaging the clutch, leaving the feed-slide I to be raised the balance of the distance by handle H⁹.

The arm S⁴, above referred to, is fixed to the lower end of an upright rock-shaft S², to the upper end of which is attached the horizontal arm S, provided with a point S′, Fig. 2, which can enter the line of type over the space-type between two words, such space-type being shorter than the character-types. Rock-shaft S² is turned in the direction to push the finger S′ across the line by means of a spiral spring s, as indicated in Fig. 6. It is moved in the opposite direction to withdraw the finger S′ by means of a cam-segment E⁵ on the end of cam E, Fig. 6. It will be seen that when shaft S² turns under the action of its spring the projection R′ is removed from under arm Q⁴, so that the clutches are held together only by the comparatively-feeble spring q, which yields when the finger S′ holds the line of type, and the clutches are forced apart by the inclined faces of their serrations. During this part of the operation the rotation of shaft C causes no movement of wheel H and feed-slide I. When, however, this finger S' and slide L are withdrawn, spring $q$ can again assert itself to draw the clutch-disks together, and projection R' again passes under the arm $Q^4$. It is while the feed-slide is at rest and shaft C continues to rotate that the slide L is by the action of cam E' and lever F moved to the left, pushing out the space-type beneath the finger S' and substituting the space type or types collected in slot $L^2$ from the type-channels K' $K^2$ $K^3$.

Although the starting and arresting of the feed-slide at the proper moments is thus effected automatically by the action of the clutch and the finger S', as just described, it will be understood that during the operation the user keeps his left hand on the handle $H^9$, thereby assisting the upward movement of the slide I at the proper intervals and insuring the certainty of the operation. This upward movement could of course be effected entirely by the handle $H^9$ and the clutch mechanism be dispensed with; but it would require considerable care on the part of the attendant to work his two hands alternately in the proper way to arrest and start the feed-slide, and the clutch mechanism is found a convenient and useful adjunct to insure starting of the feed-slide I, as soon as a substitution is effected. The finger S' after its withdrawal is released quickly and comes into contact again with the line of type, so as to be ready to act at the next interspace. As the operator is turning handle D' downward he might fail to raise his right hand quickly enough after the withdrawal of finger S', and in such case the latter would enter the same interspace. Such inadvertence is prevented by the action of the clutching mechanism.

The mechanism for determining the position of the notched bar N will now be described. It is jointed to an upright rod $T^2$, Fig. 5, which is attached at its upper end to an arm T' of a long rock-shaft T, which has a handle $T^3$ for operating it. Another arm $T^5$ of shaft T carries an index-finger $T^4$, which moves over a scale $T^6$. Another arm $T^7$, Fig. 9, of the same shaft carries a toothed segment $T^8$. When index $T^4$ has been properly set, a thin flange $E^4$, projecting from the end of cam E, enters one of the notches of the end of toothed segment $T^8$ and accurately sets and holds it and all parts connected with the operation of bar N. The latter is thus controlled during the operation of slide L. The scale $T^6$, Fig. $10^a$, is divided into a number of fields $a$ $b$ $c$ $d$, &c., each of which corresponds with a position of the stepped slide or bar N. The spaces $a$ $b$ are to one side of the zero position and the other spaces on the other side. The index $T^4$, if set on $a$ or $b$, would bring bar N to such position that slide L would collect a three-twelfths or a four-twelfths space-type, and thus shorten the line by the one-twelfth or one-sixth of an em-quad. These two combinations are a sufficient provision for lines that require to be shortened, for the reason that the compositor rarely exceeds the proper length. A more ample provision is required for justifying lines that are too short. Hence eight different positions of the index are provided, (though there may be more or less, as required.) When index $T^4$ is placed on field $c$, the normal space-type in line will be replaced by a six-twelfths type. As indicated in the drawings, these largest types are supposed to be contained in channel K'. Consequently when bar N is in what may be termed its "third" position from the beginning of its path of movement it presents no notch under slides $M^2$ $M^3$, and a notch the depth of a single six-twelfths type under slide M'. When moved forward another step—that is, when index $T^4$ is placed on field $d$—the bar N would set slides $M^2$ $M^3$ in the position indicated in Fig. 12, thus collecting a four-twelfths space from channel $K^3$ and a three-twelfths space from $K^2$, and none from K'. Thus a combination of two types aggregating seven-twelfths of an em-quad will be substituted for the five-twelfths space used in composing. When index $T^4$ is set on the next field $e$, the slide L will receive two four-twelfths spaces, and so on, as will be readily understood.

With the finger $I^6$ to show how much the line requires to be lengthened or shortened, the operator, when accustomed to the use of the machine, will readily determine what type or types he will exchange for that at each interspace of the line; but to facilitate the adjustment of the finger $T^4$ the dial $I^{11}$ is divided, as shown, into a number of fields $a$ $b$ $c$, &c., corresponding to those of the scale $T^6$, the shape of these fields being practically determined on paper by moving the hooked finger $I^8$ a distance equal to one-twelfth of an em-quad at a time, in the same manner, substantially, as a mechanic determines the shape of a cam. The finger $I^6$ is divided by graduating lines numbered, as shown, from 1 to 12. From the position which these lines assume on the dial the operator is aided in determining between how many of the available interspaces it is expedient to distribute the total amount of correction. For example, if line 4 crosses field $c$ it will indicate that four insertions of a six-twelfths space will bring the line to proper length. In such case the operator will set finger $T^4$ on field $c$, and then turn shaft C four times, making four exchanges, at the end of which the index $I^6$ should be at zero, or sufficiently close for practical purposes. In some cases it will be found that several of these lines—say 6, 7, and 8—cross the same field. In such case the indication would be that justification would be effected approximately at six interspaces by using the combination corresponding to that field. This, however, would only happen when the line is much too short, and in any case, when the index $I^6$ approaches the zero-point and the operator sees that the combination of types he is using will not exactly fill the line and that another combination will do so, he can instantly change the position of finger $T^4$ to another field. This is frequently done in the practical use of the machine. From this explanation it will be understood that the apparatus is not strictly automatic—that is, does not cease to make the predetermined substitution as soon as the line is full; but requires that the operator should always keep his eye on the constantly-changing position of index $I^6$ until he sees that it indicates the complete justification of the line. When that is shown by the index coming to zero, or within one-twelfth of an em of that point, he depresses handle $Q^5$, releasing the clutch, and raises feed-slide I to its highest position by means of handle $H^9$. When the slide I comes to rest, the curved segment $H^7$ on wheel H, Fig. 5, pushes back the bar U by striking roller $K^4$, causing the projection $U^2$ of the bar U to strike an arm V of a rock-shaft $V^6$, Fig. 2, having other arms V', which project forward and between the ends of which is pivoted an upright bar $V^2$, carrying a bent plate $V^3$. The front face of this bent plate, moving to the left, pushes the justified line out from the grip of fingers $I^8$ and $I^{12}$ into the galley X against certain frictional resistance applied to a plate X', which is attached to an arm $X^2$, projecting down from a spring-slide on a rod $X^3$; also, a bar $X^4$, Fig. 5, is pressed down by a spring on the top of the line of type as it enters the galley. To the bar U is secured a plate U', Fig. 2, between which and the bent face of the plate $V^3$ the line of type slides in its ascent. When the slide I has reached the top of its stroke, the plate U' is withdrawn by the back movement of slide U, permitting the line to be pushed into the galley. When the slide I is by the handle $H^9$ drawn down, the hook $I^8$ passes down on the right-hand side of the front bend of $V^3$, and when I approaches the end of its downstroke the segment $H^6$ on the wheel H moves forward, the roller $K^4$ and the bar U thus advancing the plate U'. The plate $V^3$ is returned by a spring on rock-shaft $V^6$, Fig. 5. During the descent of the slide I the finger $I^8$ rests upon a stop $i^6$, Fig. 1, which passes through a slot in slide $I^3$ and is secured to the bar $I^2$ of slide I.

The galley Z is fed forward step by step after the discharge of each line by means of the lever $I^{10}$, as the slide I, to which this lever is attached, is moved down to begin the feed of another line. In this descending movement the lower hooked end $I^{13}$ of said lever encounters the inclined surface of the cam-arm Y, Fig. 1, and the lever is thereby turned on its pivot $I^9$. Inasmuch as the upper end $I^{12}$ of the lever is still in the empty type-space of the galley, the latter is pushed over to the left until the end $I^{13}$ passes arm Y. When the end $I^{12}$ escapes from this groove of the galley Z, a light spring $y$, Fig. 1, which has not sufficient force to move the galley with its charge of type, tilts the lever back, bringing the end $I^{12}$ under the next type-channel. The arm Y (see Fig. 23) is pivoted to the bracket $Y^6$ and pressed by a spring $Y^3$ against a stop Y', by which its motion to the left is limited. During the ascent of the slide, however, the arm Y is tilted out of the way of the end $I^{13}$ of lever $I^{10}$, being returned by its spring when the end $I^{13}$ has passed.

Behind the galley X is a space in the framing, forming a magazine $A^8$, Fig. 2, of leads, which are pushed toward the right by a slide $A^5$, that is drawn forward by a weight $A^6$, Fig. 5, connected to it by a cord $A^7$, passing over guide-pulleys, as shown in Fig. 2. The plate U', as shown in Fig. 8, has a shoulder, which at each forward movement of U' advances one or more of the leads, introducing them between the successive lines of type in the slip-galley.

The channels K' $K^2$ $K^3$ being charged with space-types, the magazine $A^8$, with leads, and slide being placed on the right with the channels charged with composed lines of type having the shorter space-types between the words consisting of character-types, the operator proceeds as follows: By his right thumb he depresses $Q^5$, thus releasing the clutch and permitting the upward movement (by means of handle $H^9$) of the foremost line of type in galley Z, which is then raised with the hook $I^8$ resting on the uppermost type. The operator now sees how many spaces there are in the column and also notes the position of the index $I^6$ on the dial $I^{11}$. He sets his index $T^4$ to correspond and turns the handle D' and observes how the position of the index $I^6$ becomes altered. When it comes to its upright or zero position, he ceases to work the handle D' and depresses the handle $Q^5$, releasing the clutch and lifts the now-justified line of types to be pushed into the slip-galley by means of the handle $H^9$.

I claim—

1. Apparatus for justifying printing-forms, comprising, in combination with magazines for space-types, a selecting device, as specified, for selecting proper space-types from said magazines, actuating mechanism for inserting said selecting device into the line of type to be justified, and a discharging device, substantially as described.

2. In an apparatus for justifying printing-forms, the combination, with feeding mechanism for advancing the line, of magazines for space-types of different thicknesses, an adjustable selecting device, such as a reciprocating arm or slide, for selecting spaces of proper thicknesses and inserting them in said line, and mechanism for discharging the selected type or types from the selecting device into the composed line, substantially as described.

3. In a justifying apparatus, the combination of feeding devices for advancing the line to be justified, stop mechanism for arresting said line at the interspaces between words, magazines for spaces, a selecting device, such as a grooved arm or slide having a wedge-shaped point for pushing out the space to be removed, and a discharging device for introducing in the line the space-type carried by said selecting device, substantially as described.

4. The combination of the magazines for space-types, the selecting-slide reciprocating beneath said magazines, adjusting devices for said slide, so that it will select the desired type or types from said magazines at each reciprocation, and the discharging device and its actuating mechanism, substantially as described.

5. The combination of the type-feeding slide, the stop mechanism, the magazines for space-types, the selecting-slide reciprocating beneath said magazines and having a receiving-groove, the type-discharging device, and means for regulating the depth of the type-receiving groove as the said slide passes beneath each magazine, substantially as described.

6. The combination, with the magazines for space-types, of the selecting-slide reciprocating beneath the same and having a type-receiving groove, a discharging-arm pivoted to said slide and having a forked portion embracing the same alongside of said groove, and adjusting devices for regulating the position of said arm relative to the several magazines, substantially as described.

7. The combination, with the magazines for space-types, of the horizontally-reciprocating selecting-slide having a type-receiving groove, the discharging-arm pivoted to said slide and adjustable vertically to regulate the depth of said groove, vertical slides, one for each magazine, for adjusting the position of said arm, and a notched or stepped bar for setting said vertical slides, substantially as described.

8. The combination, with the reciprocatory selecting device and its discharging-arm, of type-feeding devices comprising an upper and a lower stop, between which the line of type is advanced transversely to the movement of said selecting device, a graduated scale or dial, and an index-finger thereon connected with one of said stops and showing the length of the line in course of justification, substantially as described.

9. In apparatus for justifying printing-forms, the combination, with means for inserting space-types between the words of a line, of feeding devices comprising two stops, between which the line of type is held while being justified, a dial or scale divided into fields or spaces on each side of a zero-point, and an index-finger connected with one of said stops and graduated longitudinally, substantially as and for the purpose described.

10. The combination, with the feed-slide and its appliances for feeding a line of type along a channel to a receiving-galley, and with means, as specified, for justifying said line, of a magazine for leads, a plate for pushing leads from the magazine into the galley, actuating mechanism for operating said plate at each reciprocation of said feed-slide, and a pusher-plate and its actuating mechanism for pushing the justified line from said channel into said receiving-galley, substantially as described.

In testimony whereof I have signed this specification in the presence of two subscribing witnesses.

ALEXANDER LAGERMAN.

Witnesses:
Z. L. HJELMBERG,
A. G. NYSTROM.